United States Patent
Nicholls et al.

(10) Patent No.: US 12,361,834 B2
(45) Date of Patent: Jul. 15, 2025

(54) DISPLAY OF TRAFFIC INFORMATION

(71) Applicant: Honeywell International Inc., Charlotte, NC (US)

(72) Inventors: James Alexander Nicholls, Glendale, AZ (US); Richard Berckefeldt, Paola, KS (US); Jennifer Hounslow, Burlington (CA); Supratik Gon, Bangalore (IN); Esko Mannisto, Fall City, WA (US); Michael Mead, Surprise, AZ (US); Willard R. True, Kirkland, WA (US)

(73) Assignee: Honeywell International Inc., Charlotte, NC (US)

( * ) Notice: Subject to any disclaimer, the term of this patent is extended or adjusted under 35 U.S.C. 154(b) by 42 days.

(21) Appl. No.: 17/164,184

(22) Filed: Feb. 1, 2021

(65) Prior Publication Data
US 2021/0241630 A1 Aug. 5, 2021

Related U.S. Application Data (60) Provisional application No. 62/969,565, filed on Feb. 3, 2020.

(51) Int. Cl.
*G08G 5/00* (2025.01)
*B64D 43/02* (2006.01)
(Continued)

(52) U.S. Cl.
CPC .......... *G08G 5/21* (2025.01); *B64D 43/02* (2013.01); *B64D 45/00* (2013.01); *G01S 7/10* (2013.01);
(Continued)

(58) Field of Classification Search
None
See application file for complete search history.

(56) References Cited

U.S. PATENT DOCUMENTS

| | | | |
|---|---|---|---|
| 3,573,818 A | 4/1971 | Lennon et al. | |
| 6,092,009 A * | 7/2000 | Glover | G08G 5/0086 701/14 |

(Continued)

FOREIGN PATENT DOCUMENTS

| | | |
|---|---|---|
| EP | 2966634 A2 | 1/2016 |
| EP | 2991057 A2 | 3/2016 |
| WO | WO-2011156027 A1 * 12/2011 | ............. G08G 5/065 |

OTHER PUBLICATIONS

Extended Search Report from counterpart European Application No. 21155094.2, dated Jul. 13, 2021, 9 pp.

(Continued)

*Primary Examiner* — Adam D Tissot
*Assistant Examiner* — Michael T Silva
(74) *Attorney, Agent, or Firm* — Shumaker & Sieffert, P.A.

(57) ABSTRACT

In some examples, a terrain awareness device includes processing circuitry configured to determine a terrain feature in a travel path of the ownship vehicle. The processing circuitry is also configured to present, on a display, a first graphical user interface indicating the terrain feature. The terrain awareness device also includes a memory configured to store a location of the terrain feature, and the terrain awareness device is configured to receive traffic data from a traffic device. The processing circuitry is further configured to determine a location of a second vehicle based on the traffic data and determine that the ownship first vehicle has been instructed to synchronize with a second vehicle. The processing circuitry is configured to generate a second graphical user interface indicating that the ownship vehicle (Continued)

has been instructed to synchronize with the second vehicle and present the second graphical user interface on the display.

18 Claims, 6 Drawing Sheets

(51) Int. Cl.
- B64D 45/00 (2006.01)
- G01C 21/20 (2006.01)
- G01S 7/10 (2006.01)
- G01S 13/91 (2006.01)
- G05D 1/02 (2020.01)
- G06F 3/14 (2006.01)
- G06G 7/76 (2006.01)
- G08G 5/21 (2025.01)
- G08G 5/25 (2025.01)
- G08G 5/80 (2025.01)

(52) U.S. Cl.
CPC ............ G01S 13/913 (2013.01); G06F 3/14 (2013.01); G08G 5/25 (2025.01); G08G 5/80 (2025.01)

(56) References Cited

U.S. PATENT DOCUMENTS

| | | | |
|---|---|---|---|
| 6,271,768 B1 | 8/2001 | Frazier, Jr. et al. | |
| 7,965,223 B1* | 6/2011 | McCusker | G08G 5/065 340/963 |
| 8,742,952 B1* | 6/2014 | Bold | G08G 5/0078 340/436 |
| 9,387,938 B1* | 7/2016 | Vanderkamp | G01S 7/22 |
| 9,466,220 B2 | 10/2016 | Alekseev et al. | |
| 2002/0075171 A1* | 6/2002 | Kuntman | G08G 5/0078 340/961 |
| 2003/0004641 A1* | 1/2003 | Corwin | G01S 13/913 342/29 |
| 2009/0295601 A1* | 12/2009 | Villaume | G05D 1/0223 340/961 |
| 2010/0001882 A1* | 1/2010 | Jeddi | G08G 5/045 340/961 |
| 2013/0009792 A1* | 1/2013 | Shafaat | G08G 5/0013 340/979 |
| 2013/0204523 A1* | 8/2013 | He | G08G 5/0021 701/527 |
| 2014/0368356 A1* | 12/2014 | Samuthirapandian | G08G 5/0021 340/901 |
| 2015/0120177 A1* | 4/2015 | Palanisamy | G08G 5/0021 701/120 |
| 2015/0235559 A1* | 8/2015 | Alekseev | G08G 5/025 701/120 |
| 2016/0063866 A1* | 3/2016 | Trefilova | G08G 5/0008 340/971 |
| 2016/0063869 A1* | 3/2016 | Kathirvel | G08G 5/0008 701/3 |
| 2017/0103660 A1* | 4/2017 | Shafaat | B64D 45/04 |
| 2017/0365178 A1* | 12/2017 | Shay | G08G 5/0013 |
| 2019/0012925 A1* | 1/2019 | Barker | G08G 5/0013 |
| 2019/0213890 A1* | 7/2019 | Hosamani | G08G 5/0008 |
| 2020/0166374 A1* | 5/2020 | Gunn | G08G 5/0047 |
| 2020/0339275 A1* | 10/2020 | Barber | G08G 5/0008 |

OTHER PUBLICATIONS

Response to Extended Search Report dated Jul. 13, 2021, and Rule 69 dated Aug. 24, 2021, from counterpart European Application No. 21155094.2, filed Sep. 29, 2021, 38 pp.

Communication pursuant to Article 94(3) EPC from counterpart European Application No. 21155094.2 dated Mar. 1, 2023, 7 pp.

Response to Communication pursuant to Article 94(3) EPC dated Mar. 1, 2023, from counterpart European Application No. 21155094.2 filed Jul. 3, 2023, 13 pp.

* cited by examiner

DISPLAY OF TRAFFIC INFORMATION

This application claims the benefit of U.S. Provisional Patent Application No. 62/969,565 (filed Feb. 3, 2020), the entire content being incorporated herein by reference.

TECHNICAL FIELD

This disclosure relates to a collision awareness system for vehicles.

BACKGROUND

Aircraft separation is achieved using radio communication between pilots and air traffic controllers to coordinate aircraft separation procedurally. An aircraft may include a traffic collision avoidance system (TCAS) to detect the location of proximate traffic and display the position of those aircraft to the pilot. When the TCAS detects a potential collision, the system provides an alert to the pilot and vertical guidance commands to resolve the conflict. The aviation industry is deploying a new surveillance technology called Automatic Dependent Surveillance Broadcast (ADS-B) that requires each aircraft to broadcast data including location, altitude, and other trajectory information on a common frequency that can be received on the ground and by other aircraft. ADS-B functionality enables a range of new capabilities that can improve the flow of air traffic and increase safety.

SUMMARY

In general, this disclosure describes systems, devices, and techniques for providing vehicle crew with visual indications to assist in following another vehicle assigned by a Traffic Control clearance for the purpose of conducting a navigation procedure in relationship to that other vehicle. The visual indications may include a graphical representation showing a direction of travel and/or speed of the vehicle to follow. Processing circuitry may also be configured to determine a speed for the ownship at which to follow the other vehicle, and a display may present this speed to the vehicle crew.

A terrain awareness device or a radar device may be configured to present a graphical user interface including a graphical representation that indicates a vehicle with which the ownship vehicle has been instructed to synchronize. The terrain awareness device or radar device may be configured to merge traffic data with terrain data or radar data for presentation on a display. The techniques of this disclosure may allow for a software modification of an existing terrain awareness device or an existing radar device without any modifications to the traffic device or to the display. Thus, the pilot of an older vehicle is able to view the graphical user interface on an older display without any upgrades to the display or traffic device.

In some examples, a terrain awareness device is configured to mount on an ownship vehicle, and the terrain awareness device includes processing circuitry configured to determine a terrain feature in a travel path of the ownship vehicle. The processing circuitry is also configured to present, on a display, a first graphical user interface indicating the terrain feature. The terrain awareness device also includes a memory configured to store a location of the terrain feature, and the terrain awareness device is configured to receive traffic data from a traffic device. The processing circuitry is further configured to determine a location of a second vehicle based on the traffic data and determine that the ownship first vehicle has been instructed to synchronize with a second vehicle. The processing circuitry is configured to generate a second graphical user interface indicating that the ownship vehicle has been instructed to synchronize with the second vehicle and present the second graphical user interface on the display.

In some examples, a method includes determining, by processing circuitry onboard an ownship vehicle, a terrain feature in a travel path of the ownship vehicle; generating, by the processing circuitry, a first graphical user interface indicating the terrain feature; presenting, by the processing circuitry, the first graphical user interface on a display onboard the ownship vehicle; receiving, by the processing circuitry, traffic data from a traffic device; determining, by the processing circuitry, a location of a second vehicle based on the traffic data; determining, by the processing circuitry, that the ownship vehicle has been instructed to synchronize with a second vehicle; generating, by the processing circuitry, a second graphical user interface indicating that the ownship vehicle has been instructed to synchronize with the second vehicle; and presenting, by the processing circuitry, the second graphical user interface on the display.

In some examples, a radar device is configured to mount on an ownship vehicle, and the radar device includes processing circuitry configured to determine an object in a travel path of the ownship vehicle. The processing circuitry is also configured to present, on a display, a first graphical user interface indicating the object. The radar device also includes a memory configured to store a location of the object, and the radar device is configured to receive traffic data from a traffic device. The processing circuitry is further configured to determine a location of a second vehicle based on the traffic data and determine that the ownship first vehicle has been instructed to synchronize with a second vehicle. The processing circuitry is configured to generate a second graphical user interface indicating that the ownship vehicle has been instructed to synchronize with the second vehicle and present the second graphical user interface on the display.

The details of one or more examples of the disclosure are set forth in the accompanying drawings and the description below. Other features, objects, and advantages will be apparent from the description, drawings, and claims.

DETAILED DESCRIPTION

Various examples of systems, devices, and techniques are described below for configuring a terrain awareness device or a radar device to present information to a vehicle crew. The presented information can relate to the direction and speed of travel of another vehicle, which may be travelling in front of the ownship vehicle. The presented information may also relate to a direction and speed of travel for the ownship vehicle so that the ownship vehicle may follow the other vehicle. Following a second vehicle can mean that the first vehicle directly follows the travel path of the second vehicle and/or that the first vehicle travels behind and alongside the second vehicle. In some examples, the trailing vehicle may implement the techniques of this disclosure by presenting information to the vehicle operator regarding the position, speed, and/or direction of travel of the lead vehicle or a speed command for the trailing vehicle. The vehicles may have different locations, altitudes, angles of approach, and other characteristics. For example, two aircraft may approach parallel runways, where the leading vehicle lands on one of the runways and the following vehicle lands on the other runway. The two aircraft are traveling to the same airport but not to the same runway.

In the example of an aircraft, a navigation display and/or a cockpit display of traffic information (CDTI) can present the location and trajectory of surrounding aircraft to the crew based on ADS-B data. The vehicle crew can use the navigation display and/or the CDTI to perform functions such as ensuring spacing from an aircraft in front of them that is following the same flight path or from an aircraft that is preceding them to an airport runway. In some examples, it may be desirable that aircraft be closely spaced to maximize use of the available airspace while still ensuring safe separation standards. Although this disclosure describes examples of aircraft displays, displays in other vehicles (e.g., land vehicles or marine vehicles) can implement the techniques of this disclosure.

Two particular applications of CDTI functionality are CDTI Assisted Visual Separation (CAVS) and Paired Approach, which is a particular clearance type within the broader application called Flightdeck Interval Management. In the CAVS application of CDTI, Air Traffic Control (ATC) can clear a crew to perform a Visual Approach Procedure where the crew must visually acquire a preceding aircraft with a particular flight identifier and then maintain safe separation behind that aircraft. The CAVS function can be used to aid the pilot in identifying which aircraft is the aircraft to follow by visually acquiring that aircraft out the windscreen. The CAVS function can also be used to maintain separation for a limited period if the two aircraft momentarily lose visual contact due to clouds or other conditions. The paired approach function can be used in situations of limited visibility where landing operations are desired to be occurring simultaneously on closely spaced parallel runways. In this case, ATC may clear the aircraft to fly an approach to the parallel runway, while maintaining an Assigned Spacing Goal behind the lead aircraft. The ATC can determine the assigned spacing to reduce or effectively minimize the risk of collision in the event that the lead aircraft blunders onto the path of the trailing aircraft. The following aircraft should stay close enough that the wake vortex from the lead aircraft does not have time to drift downwind from the parallel runway and create hazardous turbulence for the following aircraft.

Adding CDTI functionality may include a significant update to the software of the aircraft navigation display to support presentation of the CDTI information. In older aircraft, the existing avionics may not have the processing resources to add this functionality. A second approach may be to install a new display dedicated to the CDTI function. This again may be problematic for older aircraft due to space constraints and the cost of the new hardware. This disclosure describes a mechanism to display CDTI information in the cockpit using systems that are already installed.

Most aircraft are mandated to carry a terrain awareness warning system (TAWS) or enhanced ground proximity warning system (EGPWS). This system provides data output using a digital bus showing the height of the terrain around the aircraft relative to the aircraft altitude. The terrain awareness device also provides audio and visual alert outputs to warn the pilot of hazardous terrain.

This disclosure proposes updating the terrain awareness device software or radar software to include CDTI data from the traffic device as part of the image that is sent to the aircraft navigation display. The data sent to the display would be used to augment the existing traffic display data rather than replacing the traffic data with the new CDTI symbology. The terrain awareness device or radar device may be configured to integrate the new symbology with the terrain symbology and underlay it on existing traffic symbology without interfering with that existing symbology. The traffic symbology represents the proximate aircraft on the navigation display with a small circle, square, or diamond symbol and adjacent arrow and digital readout showing the relative altitude of the proximate aircraft. When an aircraft is identified with which the crew must maintain separation using ADS-B procedures, the terrain awareness device or radar device would send symbology to the navigation display which overlays the existing traffic symbol with an arrow or chevron that highlights the designated aircraft and indicates direction of that target aircraft. When performing paired approach functionality, the terrain awareness device or radar device can also embed a numerical display of a speed command indicating the airspeed that the crew should set in order to maintain the assigned spacing from the paired aircraft. Depicting the speed command on navigation display puts this information in the pilot's primary field of view. The terrain awareness device or radar device could also potentially use its audio output to provide an aural version of the speed command and/or alerts to the pilot that a speed change is necessary. Additional CDTI data can be presented on a control display unit (CDU) or other display.

Older vehicles may have low-resolution displays that are already certified and approved by the governing regulatory entity, such as the Federal Aviation Administration. A low-resolution display mounted on an ownship vehicle may not be programmed to present information about which vehicle the ownship should follow. Modifying the low-resolution display to present such information would involve a full replacement or an expensive and time-consuming retrofit. Using a software upgrade to a radar device or a terrain awareness device and no modification to the display, the low-resolution display may be able to present an indication of a lead vehicle that the ownship should follow, along with other information about the lead vehicle. A software upgrade to a radar device or a terrain awareness device may be a simpler process than updating and re-certifying a display device, especially in an aerospace application. The EGPWS software is also common to many aircraft types, so any updates to the EGPWS software can also be used across all those aircraft types. The display software is typically specific to the aircraft type and must therefore by updated for each target aircraft type.

Figure 1:
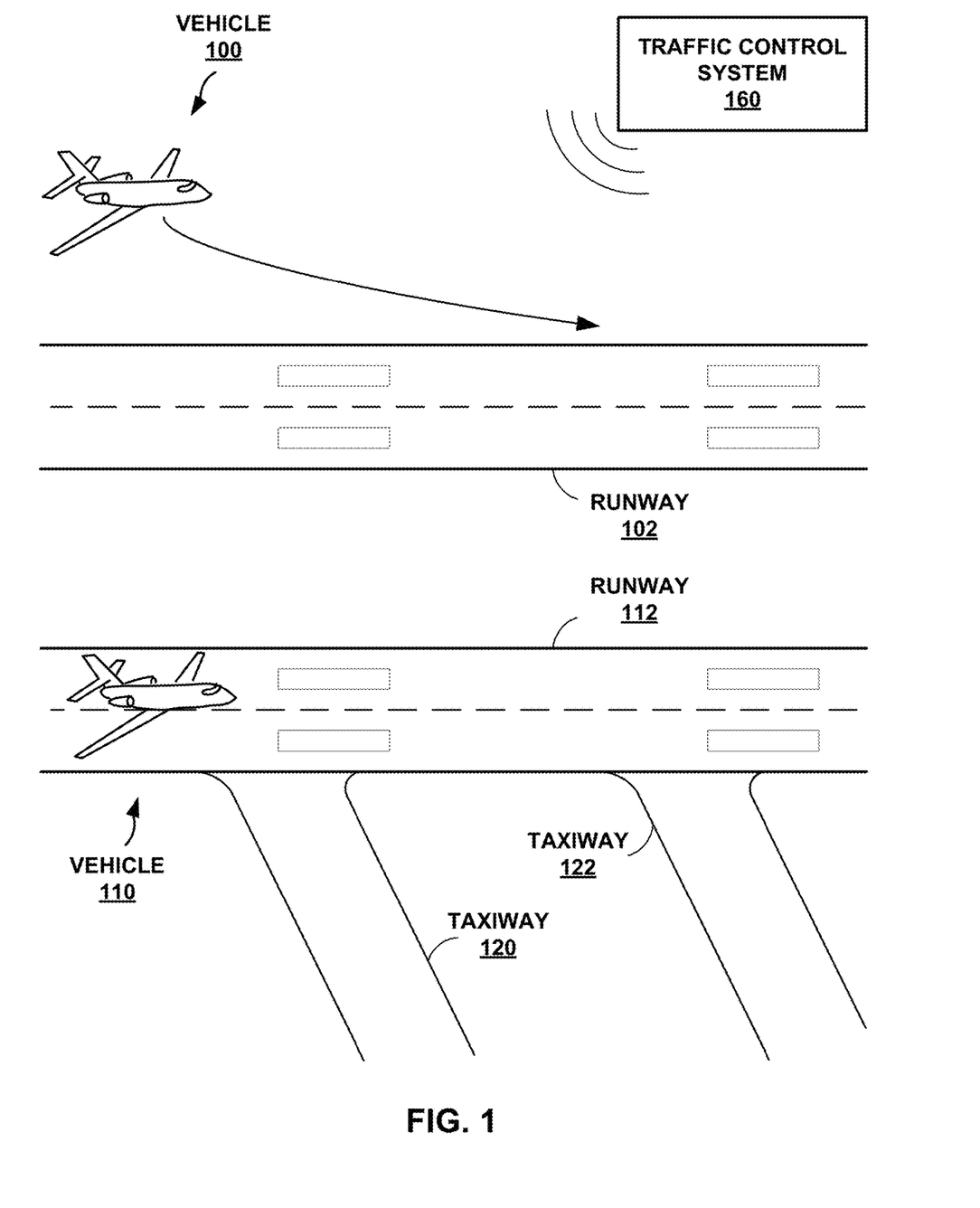
FIG. 1 is a conceptual block diagram of two vehicles approaching two runways at an aerodrome, in accordance with some examples of this disclosure.

FIG. 1 is a conceptual block diagram of vehicles 100 and 110 that are active on two runways 102 and 112, in accordance with some examples of this disclosure. Runways 102 and 112 are located in an aerodrome (e.g., an airport, airfield, or military base) that also includes taxiways 120 and 122 and traffic control system 160. A system of this disclosure (e.g., systems 200A and 200B described below) can be integrated within vehicle 100, vehicle 110, or traffic control system 160. However, in some examples, a system of this disclosure may be separate from vehicles 100 and 110 and traffic control system 160. The system may be integrated with another system in the aerodrome or may be a stand-alone system. Although FIG. 1 depicts vehicles 100 and 110 in an aerodrome, the techniques of this disclosure are applicable to vehicles maneuvering outside of an aerodrome, including traveling in the air, on the ground, or on water.

Traffic control system 160 is configured to issue clearances instructing vehicles 100 and 110 how to operate in a specific region (e.g., in the aerodrome or an air traffic region). Traffic control system 160 may operate as an air traffic controller and/or a ground controller by issuing clearances, commands, and/or instructions to vehicles 100 and 110.

Traffic control system 160 may include a system managed by an air traffic controller, an autonomous vehicle control center, or any other system for controlling the movements of vehicles. For example, traffic control system 160 can instruct vehicle 100 to land on runway 102 or to take a specific travel path after landing on runway 102. In the example of a system managed by an air traffic controller, traffic control system 160 can monitor and command the movements of vehicles 100 and 110 on and around runways 102 and 112, taxiways 120 and 122, intersections, apron parking bays, gates, hangars, and other areas in the aerodrome. The techniques of this disclosure may also be applied outside of an aerodrome. In the context of land vehicles, the traffic control system may include an autonomous vehicle management system.

Traffic control system 160 may be configured to instruct vehicle 100 to synchronize with vehicle 110. For example, traffic control system 160 can send a clearance instructing vehicle 100 to follow vehicle 110 as vehicles 100 and 110 approach to runway 102 or 112. The clearance sent by traffic control system 160 may include audio data such as a voice signal, text data, and/or any digital data that causes a communication management unit (CMU) onboard vehicle 100 to determine that vehicle 100 has been instructed to synchronize with vehicle 110.

Although FIG. 1 depicts vehicles 100 and 110 as airplanes, vehicles 100 and 110 may be any mobile objects or remote objects. In some examples, vehicles 100 and/or 110 may be an aircraft such as an airplane, a helicopter, or a weather balloon, or vehicles 100 and/or 110 may be a space vehicle such as a satellite or spaceship. In yet other examples, vehicles 100 and/or 110 may include a land vehicle such as an automobile or a water vehicle such as a ship or a submarine. Vehicles 100 and/or 110 may be a manned vehicle or an unmanned vehicle, such as a drone or a remote-control vehicle.

Vehicles 100 and 110 may be configured to transmit and/or receive surveillance messages indicating the position, velocity, and/or altitudes of the transmitting vehicle. Vehicles 100 and 110 may transmit surveillance messages using one or more communication protocols such as traffic collision avoidance system (TCAS), automatic-dependent surveillance-broadcast (ADS-B), transponder protocol, universal access transceiver (UAT), automatic identification system (AIS), and/or any other type of position reporting, including a reporting protocol for automobiles.

Figure 2A:
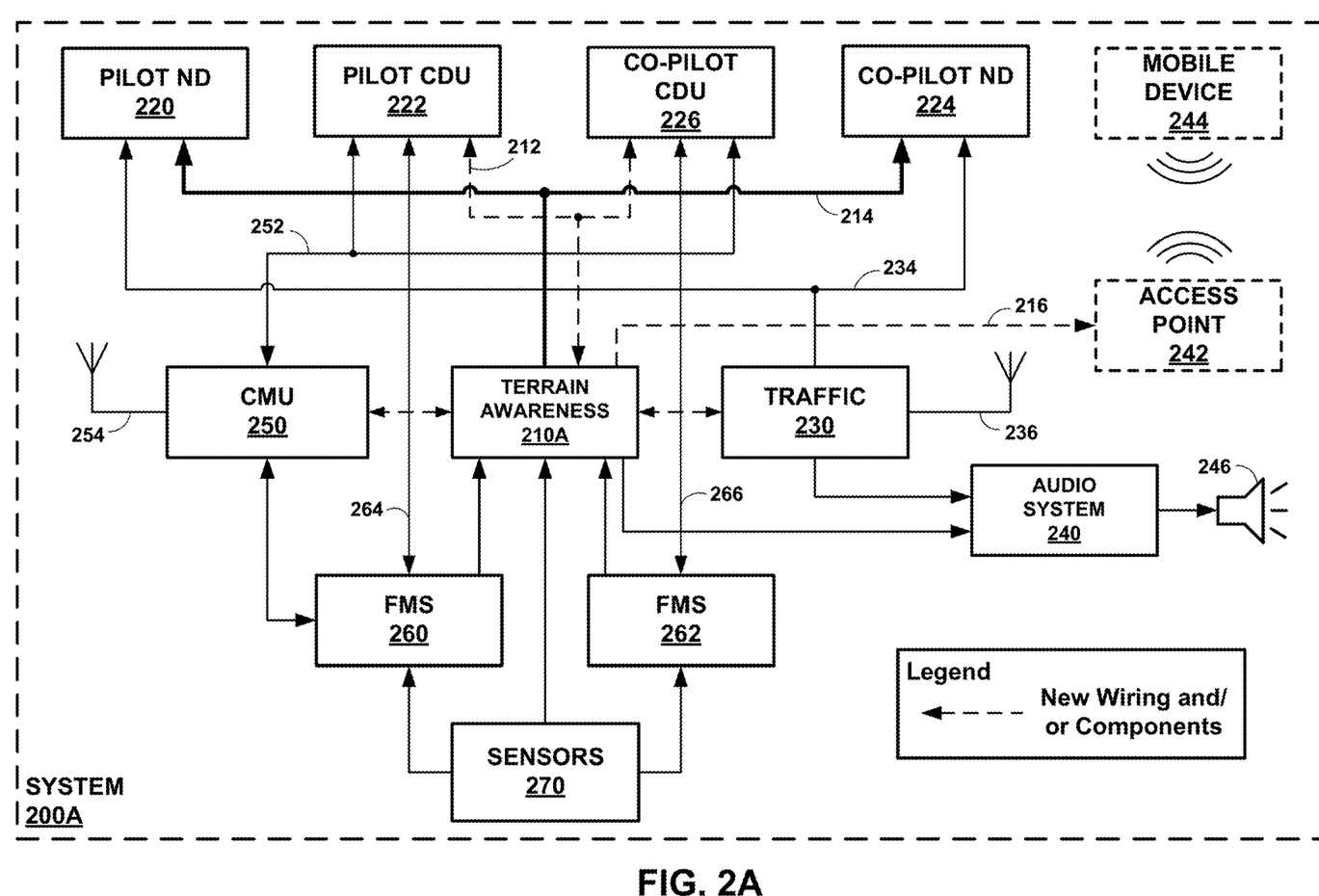
FIGS. 2A and 2B are conceptual block diagrams of example systems within a vehicle for presenting information to a crew of the vehicle.
Figure 2B:
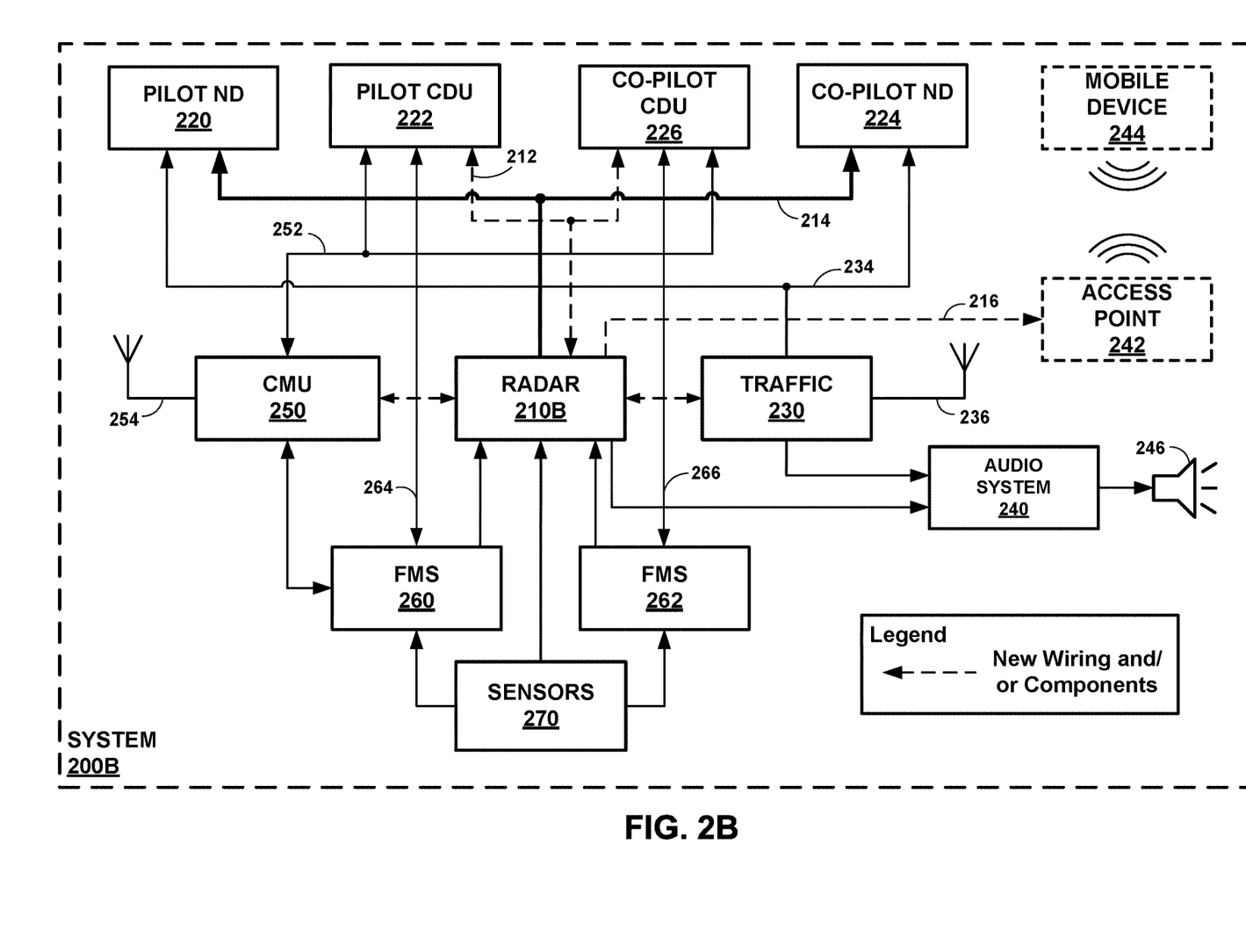

FIGS. 2A and 2B are conceptual block diagrams of example systems 200A and 200B within a vehicle for presenting information to a crew of the vehicle. FIGS. 2A and 2B depict systems 200A and 200B as an avionics system that can be mounted in an aircraft, but other vehicle applications are contemplated by this disclosure, including automobiles, water vehicles, amphibious vehicles, space vehicles, and so on. As shown in FIGS. 2A and 2B, systems 200A and 200B include navigation displays 220 and 224, control display units 222 and 226, traffic device 230, audio system 240, access point 242, mobile device 244, CMU 250, flight management systems 260 and 262, and aircraft sensors 270. System 200A includes a terrain awareness device 210A, and system 200B includes radar device 210B.

Terrain awareness device 210A may include a terrain awareness and warning system, a ground proximity warning system, and/or an enhanced ground proximity warning system. Terrain awareness device 210A may be configured to store terrain features in the travel path of the ownship vehicle to a memory that is built into or external to terrain awareness device 210A. Terrain awareness device 210A may be configured to also determine the relative location of each terrain feature based on the latitude and longitude of the ownship vehicle and each terrain feature. Terrain awareness device 210A may be configured to present, on navigation display 220 or 224 via connection 214 or on mobile device 244, a graphical user interface indicating one or more terrain features. Connection 214 may include an ARINC-708 connection, an ARINC-453 connection, and/or a weather radar bus connection.

Radar device 210B may include a weather radar system, a nose-mounted or wingtip-mounted sensor system, and/or a lidar system. Radar device 210B may be configured to store data for objects (e.g., weather formation, obstacles, etc.) in the travel path of the ownship vehicle to a memory that is built into or external to radar device 210B. Radar device 210B may be configured to also determine the relative location of each object based on the latitude and longitude of the ownship vehicle and each terrain feature. Radar device 210B may be configured to present, on navigation display 220 or 224 via connection 214 or on mobile device 244, a graphical user interface indicating one or more objects.

In accordance with the techniques of this disclosure, terrain awareness device 210A or radar device 210B may be configured to receive traffic data from traffic device 230 and present an indication of the traffic data via navigation display 220 or 224 or on mobile device 244. For example, terrain awareness device 210A or radar device 210B may be configured to determine that the ownship vehicle has been instructed to synchronize with another vehicle (e.g., follow, travel alongside, or lead the other vehicle), and terrain awareness device 210A or radar device 210B can present an indication of this instruction via navigation display 220 and/or 224 or mobile device 244. Terrain awareness device 210A or radar device 210B may be configured to also determine and present an indication of the direction of travel of the other vehicle and/or an indication of a speed command via navigation display 220 and/or 224 or mobile device 244.

Terrain awareness device 210A or radar device 210B may be configured to determine that the ownship vehicle has been instructed to synchronize with another vehicle based on a clearance received by the CMU 250 from a traffic control system. The clearance may, for example, include an instruction for ownship vehicle to follow or otherwise synchronize with a second vehicle. CMU 250 can send an indication of the clearance to terrain awareness device 210A or radar device 210B. Additionally or alternatively, terrain awareness device 210A or radar device 210B may be configured to determine that the ownship vehicle has been instructed to synchronize with another vehicle based on user input received by control display unit 222 or 226 or mobile device 244. For example, the vehicle operator may select which vehicle to follow from a list of nearby vehicles presented by control display unit 222 or 226. Terrain awareness device 210A or radar device 210B may be configured to also determine that the ownship vehicle has been instructed to synchronize with another vehicle based on the traffic data received by traffic device 230.

In some examples, terrain awareness device 210A or radar device 210B may be configured to merge and/or overlay the traffic data received from traffic device 230 with terrain data or radar data to generate one or more graphical user interfaces. For example, terrain awareness device 210A or radar device 210B may be configured to generate a single graphical user interface including a first graphical representation indicating the traffic data and a second graphical representation indicating the terrain data or radar data. Terrain awareness device 210A or radar device 210B may then present the single graphical user interface via navigation display 220 and/or 224 or on mobile device 244. Additionally or alternatively, terrain awareness device 210A or radar device 210B may be configured to generate a first graphical user interface indicating the traffic data and a second graphical user interface indicating the terrain data or radar data. Terrain awareness device 210A or radar device 210B may be configured to present the first graphical user interface or the second graphical user interface via navigation display 220 and/or 224 or on mobile device 244, for example, with an option for the user to toggle between the first and second graphical user interfaces. In some examples, a graphical user interface described herein includes a graphical representation presented to user without any ability to receive user input.

Terrain awareness device 210A or radar device 210B may be configured to receive user input from control display units 222 and/or 226, where the user input may include the selection of another vehicle to follow. Additionally or alternatively, the user input may indicate a desired spacing between the ownship vehicle and the other vehicle with which the ownship vehicle will be synchronized. A vehicle operator such as a pilot, co-pilot, crewmember, driver, or captain may provide the user input to control display units 222 and/or 226. Control display units 222 and/or 226 can send the user input data to terrain awareness device 210A or radar device 210B via connection 212, which may include an ARINC-739 connection.

Navigation displays 220 and 224 may be configured to present graphical user interfaces indicating traffic data, terrain data, and/or radar data. Navigation displays 220 and 224 or mobile device 244 can receive a graphical user interface for presentation from terrain awareness device 210A, radar device 210B, CMU 250, and/or flight management systems 260 and 262. Navigation displays 220 and 224 may be existing displays within an older aircraft. As such, navigation displays 220 and 224 may have relatively low resolution with limited display capabilities. In some examples, a low-resolution navigation display has less than twelve hundred pixels in both dimensions.

Control display units 222 and 226 may include one or more multi-function control display units configured to present information to the operator(s) and crewmember(s) of the ownship vehicle. For example, control display units 222 and 226 may be configured to output a menu or list of other vehicles and prompt a user to select one of the other vehicles for ownship vehicle to synchronize with. Control display units 222 and 226 may be configured to also receive user input indicating a desired spacing between vehicles and/or a desired travel time between vehicles. Control display units 222 and 226 may primarily interface with flight management systems 260 and 262, but control display units 222 and 226 can also communicate with other devices such as terrain awareness device 210A and radar device 210B, either of which may be configured to include an ARINC-739 interface.

Traffic device 230 may be configured to receive surveillance messages from other vehicles via antenna 236. Traffic device 230 may be capable of receiving and/or transmitting the following messages: ADS-B, traffic collision avoidance system, transponder, Universal Access Transmitter, distance measuring equipment, and/or any other types of messages. The surveillance message may include data about the other vehicles, such as position, velocity, altitude, and/or future maneuvers. Traffic device 230 may be able to present traffic data on navigation displays 220 and 224 via connection 234, which may include an ARINC-429 connection.

Traffic device 230 may be configured to send traffic data to terrain awareness device 210A or radar device 210B, where the traffic data can include the relative positions and velocities of other vehicles. Based on the data received from traffic device 230, terrain awareness device 210A or radar device 210B may be configured to generate a graphical user interface including graphical representation(s) of other vehicles that indicate the relative positions of the other vehicles.

Audio system 240 may be configured to receive audio data from terrain awareness device 210A, radar device 210B, and/or traffic device 230 for output to a vehicle operator or crewmember. For example, terrain awareness device 210A or radar device 210B may be configured to output a verbal command to a user via audio system 240 and speaker 246, such as an indication of a speed command, an instruction to increase or decrease the speed of the ownship vehicle, or an instruction to maintain a particular spacing. For example, terrain awareness device 210A or radar device 210B may be configured to cause audio system 240 and speaker 246 output a verbal statement such as "increase speed to two hundred knots," "decrease speed by five knots," or "travel at two hundred knots to maintain desired spacing."

Access point 242 is communicatively coupled to mobile device 244 via Wi-Fi, Bluetooth, ethernet, and/or any other connection. Terrain awareness device 210A or radar device 210B may be configured to present traffic data on control display unit 222, control display unit 226, and/or mobile device 244. For example, terrain awareness device 210A or radar device 210B can send a graphical user interface to access point 242 for transmission to mobile device 244, which may include a tablet, mobile phone, and/or laptop computer. Connection 216 may be an ARINC-429 connection.

CMU 250 may be configured to receive messages from a traffic control system via antenna 254. For example, a traffic control system may send a clearance to CMU 250 instructing the ownship vehicle to synchronize with another vehicle. For example, an air traffic control center can send a clearance instruction to CMU 250 with an indication of the other vehicle that the ownship vehicle should follow, lead, travel alongside, travel in formation with, and/or approach a pair of runways in a coordinated manner with. CMU 250 can send the clearance data to terrain awareness device 210A or radar device 210B, and terrain awareness device 210A or radar device 210B may be configured to use the clearance data to generate a graphical user interface indicating the other vehicle with which the ownship vehicle should synchronize.

CMU 250 can also present information on and/or receive user inputs from control display units 222 and 226 via connection 252, which will include an ARINC-739 connection.

Flight management systems 260 and 262 may be configured to also receive user input indicating a travel plan for the ownship vehicle. Flight management systems 260 and 262 may be configured to determine a course from the current position of the ownship vehicle to the destination in the travel plan. Flight management systems 260 and 262 can present information on control display units 222 and 226, such as a travel path for the ownship vehicle, via connections 264 and 266, which may include an ARINC-739 connection.

Sensors 270 may include an inertial navigation system for determining the velocity and/or orientation of the ownship vehicle. To determine the orientation of the ownship vehicle, sensors 270 or flight management systems 260 and 262 may be configured to determine the pitch, roll, and yaw of the ownship vehicle. Sensors 270 may also include one or more accelerometers (angular and/or linear accelerometers), one or more gyroscopes, one or more magnetic sensors, one or more speed sensors, and/or an altimeter.

Synchronizing vehicle travel is especially important in the context of aviation. For example, during low visibility circumstances and/or where runways are shut down due to the marine layer or cloud, many airlines are impacted by millions of dollars each year due to delays and go arounds. The San Francisco airport is commonly affected by this issue and prevents air travel operations from occurring safely and on time. This disclosure describes techniques to allow an airline operator to use existing terrain awareness hardware or radar hardware with a software modification to create a visual environment in the cockpit providing a safe way to operate and land on closely spaced parallel runways when weather conditions would normally not permit.

Because this implementation of CDTI and Flightdeck Interval Management (FIM) functionality uses existing components installed in the aircraft, the aircraft installation cost and time may be reduced dramatically in some instances. Aircraft downtime associated with a modification is a critical criteria for airlines due to the loss of revenue while the aircraft is being modified. The techniques of this disclosure potentially not only minimize hardware cost but also reduce installation time by using existing components installed in the aircraft. For older aircraft where the display system is not capable of being updated due to processor limitations and where space constraints preclude installation of a new display, this solution may be very attractive.

The aviation industry is early in the process of adopting CDTI technology. Investing in CDTI and FIM implementations at this point in the cycle ensures maximum opportunity to penetrate the market. Because the anticipated operational savings for the end customers, there is substantial market demand for the FIM applications of CDTI. This disclosure describes techniques that may not entail a complete CDTI implementation, but some of the FIM applications may drive airline operational savings. As the aircraft certification authority and ATC provider, the Federal Aviation Administration is motivated to facilitate opportunities to deploy CDTI applications.

The techniques of this disclosure can potentially be a very attractive implementation for an airline operator because of the cost and ease of upgrading a radar device or a terrain awareness device. This implementation of CDTI can be easily retrofitted, low cost, and can be quickly rolled out to an entire fleet of vehicles.

Conceptual symbology for support of this functionality is illustrated in the attached presentation. The presentation also provides a block diagram of the system architecture. Implementation may include software updates to a traffic device and/or a terrain awareness device. Returning to systems 200A and 200B illustrated in FIG. 2, there are several new wiring connections that could be involved, particularly, between traffic device 230 and terrain awareness device 210A or radar device 210B. This interface would typically be implemented using an ARINC-429 databus, however other implementations are possible. Typical CDTI displays would present a range of other data regarding the designated target aircraft for pairing. Because this data can add substantial clutter on navigation display 220 or 224 if embedded in the display output of terrain awareness device 210A or radar device 210B, the data can also be presented on some other display in the cockpit, such as control display unit 222 or 226.

A range of potential other display options can be considered. Many aircraft have a display terminal with a keypad that is referred to as a CDU. The CDU is typically located beside the pilot on the pedestal area of the cockpit rather than in the forward field of view. The CDU can be used to present information that does not need to be in the primary field of view. Interface with the CDU would typically be implemented via an ARINC-739 protocol interface. The CDU also provides a keypad so in addition to displaying data, the CDU could be used to allow the operator to enter data for the FIM applications such as the identifier of the assigned aircraft which is to be paired.

To enable display on CDU 222 or 226, a new connection can be used between terrain awareness device 210A or radar device 210B and the CDUs. The CDUs typically support the ARINC-739 protocol using an ARINC-429 databus. The software for terrain awareness device 210A or radar device 210B may be updated to support communication on this databus. To minimize the extent of wiring changes, the interface of CDU 222 or 226 may alternatively be implemented by transmitting the commands to the CDU 222 or 226 via CMU 250. CMU 250 is essentially a router and is used to provide aircraft datalink capability to support both airline operational and ATC datalink messages. CMU 250 already uses the CDU for display purposes and could potentially be used to route messages from terrain awareness device 210A or radar device 210B for display to the crew on CDU 222 and/or 226.

Use of CMU 250 to transmit data to CDU 222 or 226 may also facilitate an implementation where the target aircraft to pair with is uplinked automatically from ATC via the CMU datalink capability. Implementation of the datalink user interface capability would minimize errors and miscommunication between ATC and the pilots. Another potential user interface option in place of CDU 222 or 226 may be mobile device 244 (e.g., a tablet device) used as an EFB by the pilots. Use of an EFB would provide significant flexibility. Data integrity and cyber security can be preserved using a careful design approach.

Figure 3A:
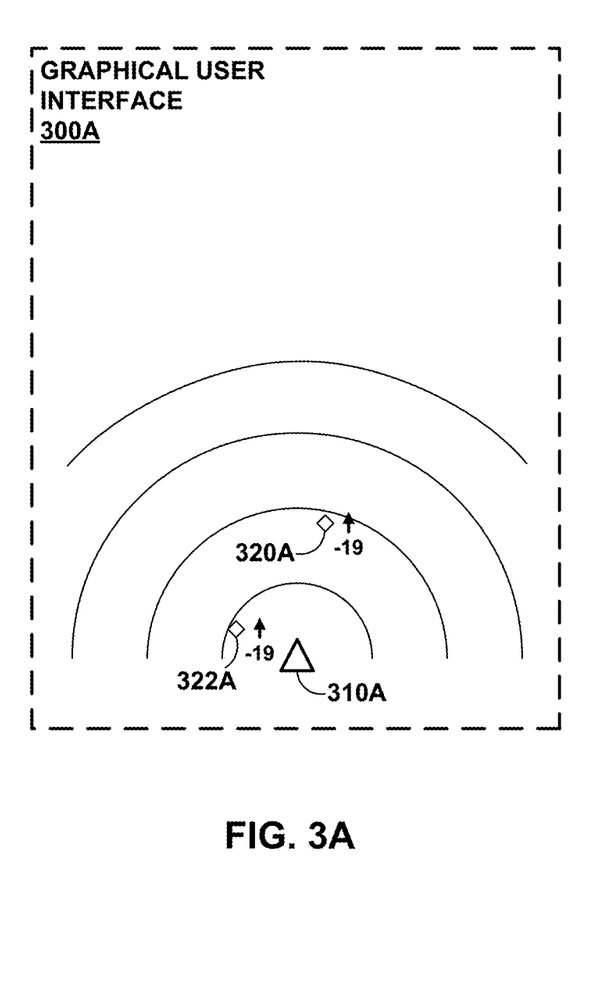
FIGS. 3A and 3B are example graphical user interfaces showing vehicle traffic.
Figure 3B:
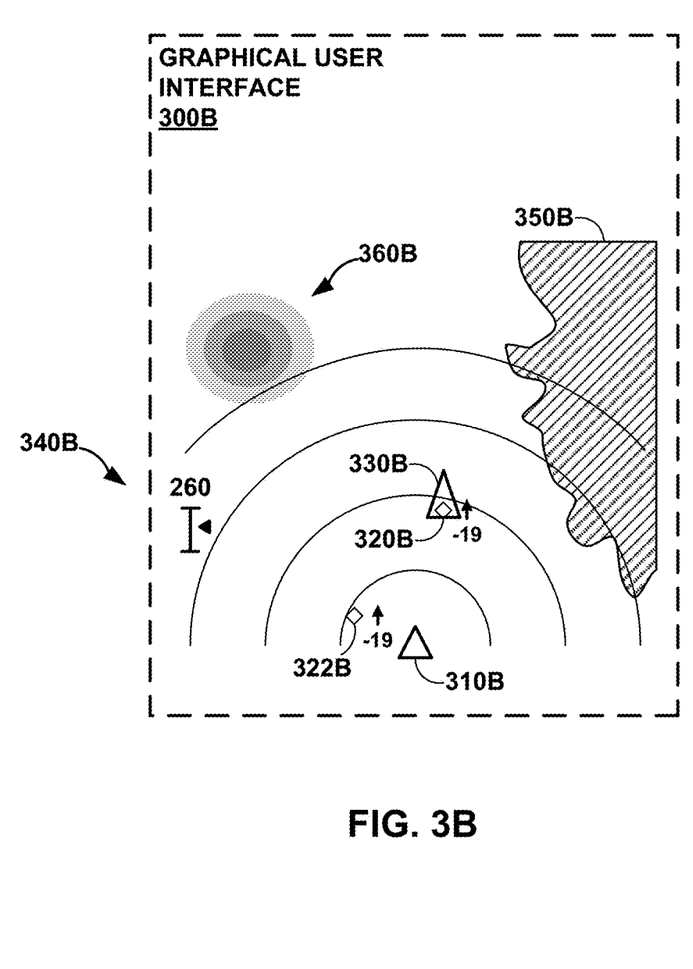

FIGS. 3A and 3B are example graphical user interfaces 300A and 300B showing vehicle traffic. Graphical user interfaces 300A and 300B can be presented by terrain awareness device 210A or by radar device 210B on navigation displays 220 and 224 shown in FIGS. 2A and 2B. Graphical user interface 300A includes graphical representation 310A of the ownship vehicle and graphical representations 320A and 322A of the other vehicles. Graphical representation 310A includes an icon (e.g., a triangle) that indicates the direction of travel of the ownship vehicle.

Graphical user interface 300B includes graphical representation 310B of the ownship vehicle and graphical representations 320B and 322B of the other vehicles. Graphical representation 310B includes an icon (e.g., a triangle) that indicates the direction of travel of the ownship vehicle.

Graphical representations 320A and 322A include an icon indicating the locations of the other vehicles relative to the location of the ownship vehicle. In addition, graphical user interfaces 300A and 300B include a numerical value indicating the altitude of the other vehicles relative to the altitude of the ownship vehicle. Both of the other vehicles are 1,900 feet below the ownship vehicle, as indicated by the text "−19" next to graphical representations 320A, 320B, 322A, and 322B. The upward-pointing arrow next to graphical representations 320A, 320B, 322A, and 322B indicates that the other vehicles are ascending at five hundred feet per minute or greater.

FIG. 3B shows a graphical user interface 300B including graphical representations 340B, 320B, and 330B for a speed command, a target vehicle, and a direction of travel of the target vehicle. Graphical representation 330B indicates that the target vehicle is traveling in approximately the same direction as the ownship vehicle. In the example shown in FIG. 3B, graphical representation 330B includes a triangle pointing in the direction that the other vehicle is traveling. Graphical user interface 300B also includes graphical representation 340B indicating a speed command for the ownship vehicle to travel at a target speed. For example, graphical representation 340B can include a numerical value of the target speed for the ownship vehicle (e.g., 260 knots).

Graphical representation 340B can also include an indication of whether the ownship vehicle should increase or decrease speed. Graphical representation 340B includes an I-shaped icon and a triangle pointing at the middle of the I-shaped icon. To indicate that the ownship vehicle should increase speed, the triangle can point at the upper end of the I-shaped icon. To indicate that the ownship vehicle should decrease speed, the triangle can point at the lower end of the I-shaped icon. The speed command can provide an easy-to-understand visual cue to the operator of the ownship vehicle of whether to increase or decrease speed to maintain the desired spacing with a target vehicle.

Additionally or alternatively, graphical user interface 300B may also include a graphical representation of the desired spacing between the ownship vehicle and the target vehicle. For example, the graphical representation may include a numerical value indicating the desired spacing in meters, kilometers, feet, or miles. The graphical representation may also include an indication of whether the operator of the ownship vehicle should increase or decrease the spacing between the ownship vehicle and the target vehicle.

An existing traffic device may present graphical user interface 300A with icons for target vehicles near the ownship vehicle. A terrain awareness device of this disclosure may be configured to present graphical user interface 300B including graphical representation 350B, which indicates a terrain feature such as a mountain range. The terrain awareness device can generate graphical user interface 300B (e.g., without graphical representation 360B) by merging or overlaying traffic data and terrain data. A radar device of this disclosure may be configured to present graphical user interface 300B including graphical representation 360B, which indicates an object detected by the radar device, such as a storm cell. The radar device can generate graphical user interface 300B (e.g., without graphical representation 350B) by merging or overlaying traffic data and radar data. The terrain and object represented by graphical representations 350B and 360B can be considered as within the travel path of the ownship vehicle even though the terrain and object are not directly in front of the ownship vehicle. In some examples, a device of this disclosure may be configured to generate a graphical user interface indicating traffic data, terrain data, and radar data.

Figure 4:
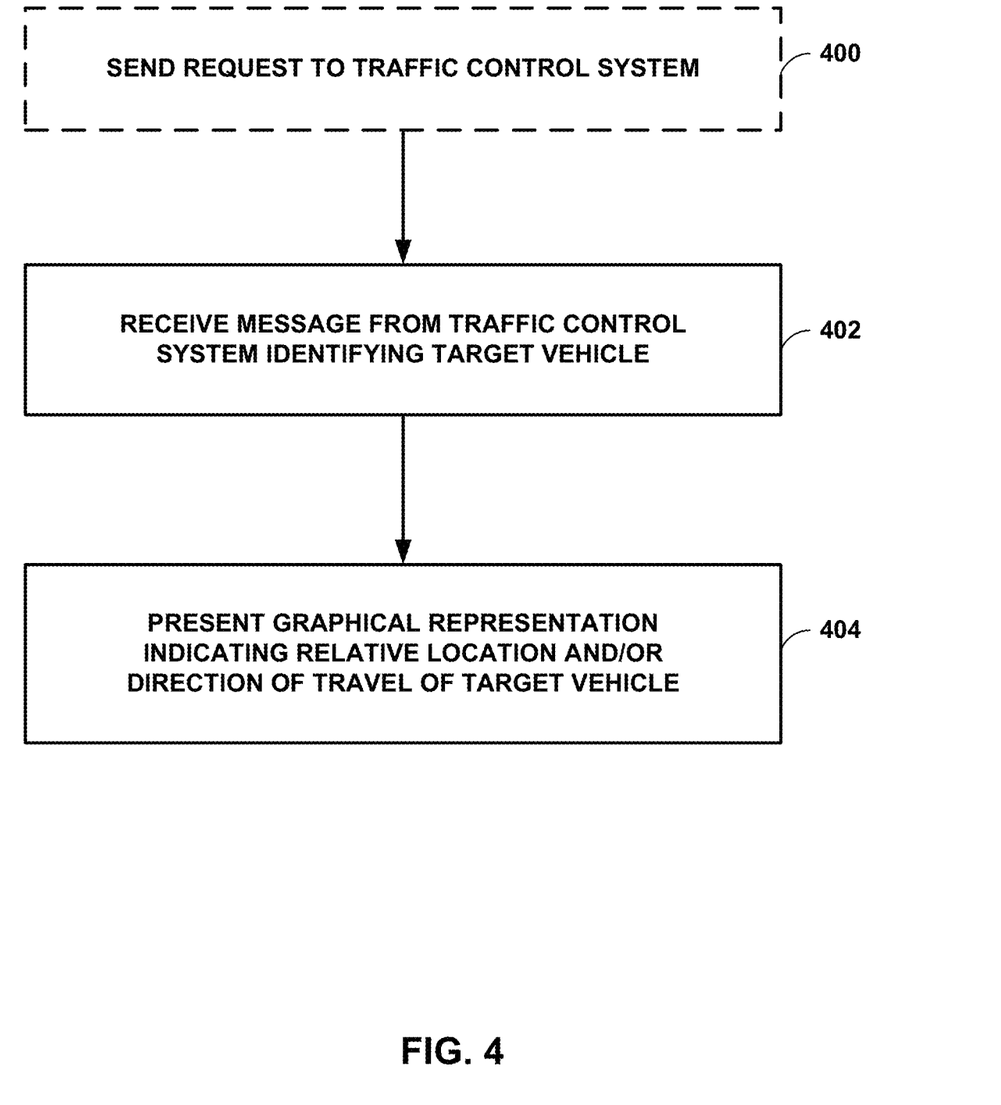
FIG. 4 is a flowchart illustrating example techniques for presenting information about a target vehicle.

FIG. 4 is a flowchart illustrating example techniques for presenting information about a target vehicle. An example approach procedure using the FIM capability can be conducted using the following possible steps or a subset thereof. These steps are merely one example, and other steps are contemplated by this disclosure. In addition, even though these steps are described in the context of an aircraft, the techniques described herein may be applicable to other types of vehicles as well. First, the system submits an ATC request to perform an approach to a runway at which paired operations are occurring (400). Additionally or alternatively, the traffic control system may already be aware that the vehicle is equipped with the appropriate functionality (e.g., paired approach avionics) and may not need to receive a request from the vehicle.

Second, the system receives a message from ATC typically via voice connection, approving the approach to the runway and identifying the target aircraft to which the crew should pair the ownship aircraft (402). After receiving the instruction to pair with the target aircraft, the operator of the ownship aircraft may travel behind and off to the side of the target aircraft. Additionally or alternatively, the instruction to synchronize with another vehicle may come from the vehicle crew via user input.

Third, the crew enters target aircraft identifier via the user interface. Additionally or alternatively, the system may acquire or determine the target identifier from the message received from the traffic control system without having the crew enter the information into the system. Fourth, the terrain awareness device or radar device may be configured to display a graphical representation such as an arrow or chevron on a display highlighting the target aircraft and/or showing a direction of motion for the target aircraft (404).

Fifth, the crew enters approach procedure to identify for the terrain awareness device or radar device which airport and runway the aircraft is flying to, the approach procedure and the spacing required from that paired aircraft. Sixth, the traffic device continuously or periodically updates the legacy traffic symbology showing all traffic on the navigation display. Seventh, the terrain awareness device or radar device continuously or periodically updates the location of the graphical representation of the target aircraft (e.g., arrow or chevron) to highlight the paired aircraft. Eighth, the terrain awareness device or radar device provides a speed command output which is displayed on the interface of the navigation display to ensure that the aircraft achieves the required spacing from the paired aircraft.

Ninth, the flight crew either enters the speed command into the FMS or adjusts the manual speed reference to match the speed command indicated by the terrain awareness device or radar device. The crew may perform additional flight control actions to achieve the commanded speed such as application of speed brakes, flaps, or landing gear. Tenth, the flight crew follows the approach procedure lateral and vertical guidance, typically using the flight management system or instrument landing system. Eleventh, the flight crew continuously monitors the speed command from the terrain awareness device or radar device and updates the aircraft speed reference to match. Twelfth, the pilot monitors CDTI data from the paired aircraft using navigation display of traffic symbols, augmented by a graphical representation of the target aircraft (e.g., arrow or chevron) and the additional CDTI detailed data presented on the control display unit. The various steps described above as being performed by a pilot or crew may, in some examples, be fully or partially automated.

A potential alternative line-replaceable-unit that could host this function in a manner similar to the terrain awareness device or radar device is any device with an ARINC-708, an ARINC-453, or a weather radar databus interface such as a radar. Like the terrain awareness device, the radar also provides a display output that can be presented on the aircraft navigation display and used to overlay existing data on the display. This architecture could be similar to that discussed above, with the radar replacing the terrain awareness device or radar device as the host for the function.

Figure 5:
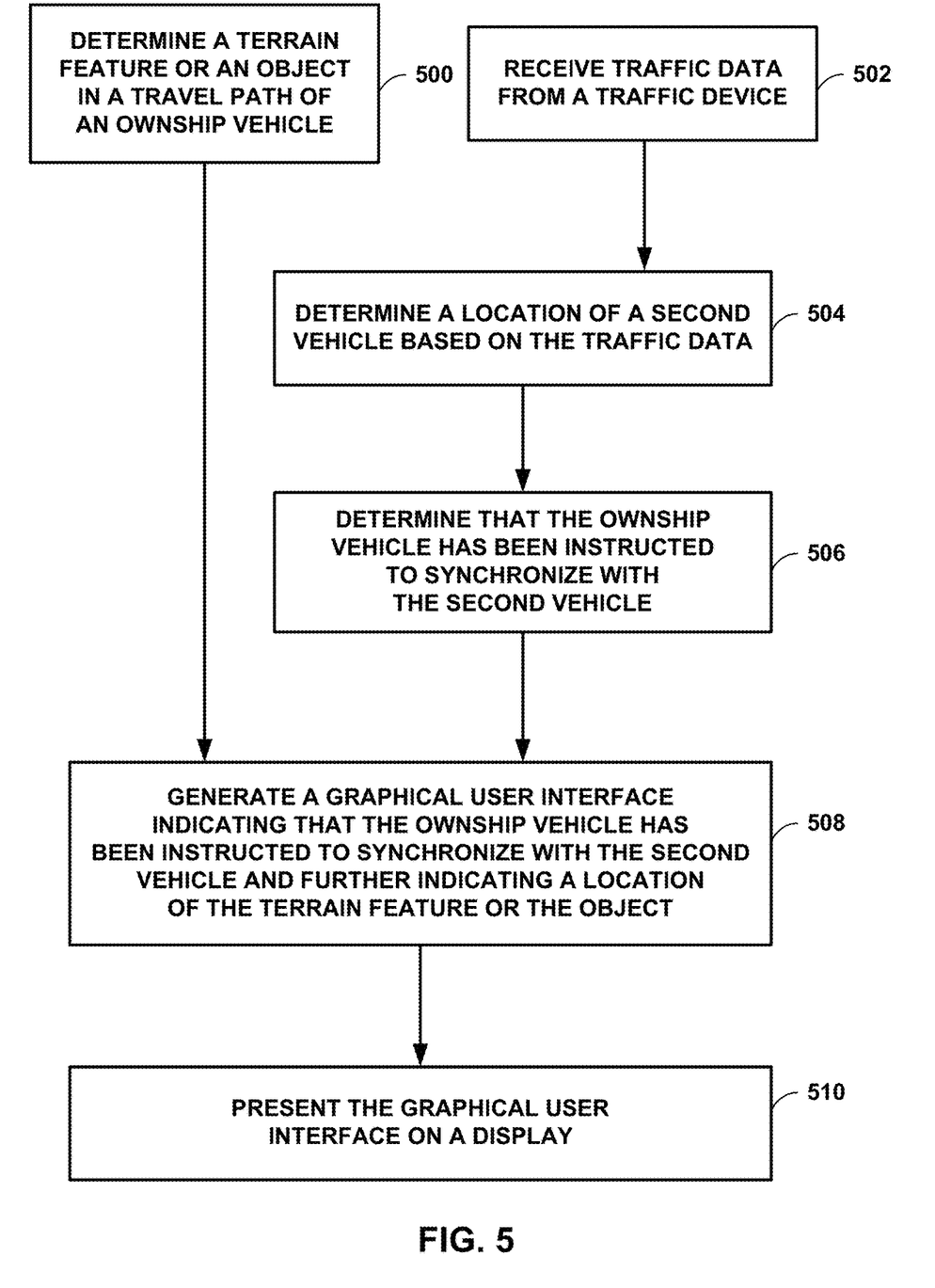
FIG. 5 is a flowchart illustrating example techniques for generating a graphical user interface that includes traffic data and terrain data or radar data.

FIG. 5 is a flowchart illustrating example techniques for generating a graphical user interface that includes traffic data and terrain data or radar data. The techniques of FIG. 5 are described in the context of systems 200A and 200B shown in FIGS. 2A and 2B, although other components such as vehicles 100 and 110 may also perform the techniques of FIG. 5.

In the example of FIG. 5, terrain awareness device 210A or radar device 210B determines a terrain feature or an object in a travel path of the ownship vehicle (500). For example, terrain awareness device 210A may be configured to retrieve terrain data from memory, where memory stores a map of terrain features for an area that includes the travel path of the ownship vehicle. As another example, radar device 210B may be configured to determine the location of an object based on radar returns that reflected off the object.

Terrain awareness device 210A or radar device 210B also receives traffic data from traffic device 230 (502). The traffic data may include surveillance messages received from other vehicles. Terrain awareness device 210A or radar device 210B then determines a location of a second vehicle based on the traffic data (504). Terrain awareness device 210A or radar device 210B can determine the location of the second vehicle relative to the ownship vehicle based on the location of the ownship vehicle and the location of the second vehicle (e.g., as indicated in a surveillance message received from the second vehicle).

In the example of FIG. 5, terrain awareness device 210A or radar device 210B determines that the ownship vehicle has been instructed to synchronize with the second vehicle (506). For example, terrain awareness device 210A or radar device 210B may receive an indication from CMU 250 that CMU 250 has received a clearance from a traffic control system. Additionally or alternatively, control display unit 222 or 226 may receive user input selecting a target vehicle to synchronize with and may transmit an indication of the user input to terrain awareness device 210A or radar device 210B.

In the example of FIG. 5, terrain awareness device 210A or radar device 210B generates a graphical user interface indicating that the ownship vehicle has been instructed to synchronize with the second vehicle and further indicating a location of a terrain feature or an object (508). The graphical user interface may include a first graphical representation indicating that the ownship vehicle should follow or otherwise synchronize with the second vehicle. The graphical user interface may include a second graphical representation indicating the location of a terrain feature or the location of an object such as an obstacle or a weather formation. Terrain awareness device 210A or radar device 210B then presents the graphical user interface on navigation display 220 and/or 224 or on mobile device 244. Terrain awareness device 210A or radar device 210B may be configured to present the graphical user interface on a display (510).

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile random access memory, electrically erasable programmable read-only memory (EEPROM), or flash memory. The computer-readable storage media may be configured to store non-transitory signals.

The techniques described in this disclosure may be implemented, at least in part, in hardware, software, firmware or any combination thereof. For example, various aspects of the techniques may be implemented within one or more processors, including one or more microprocessors, digital signal processors, application-specific integrated circuit, field-programmable gate arrays, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an application-specific integrated circuit, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, where the operations described herein may be distributed across the processors and devices.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The following numbered examples demonstrate one or more aspects of the disclosure.

Example 1. A method includes determining a terrain feature in a travel path of an ownship vehicle; generating a first graphical user interface indicating the terrain feature; presenting the first graphical user interface on a display onboard the ownship vehicle; receiving traffic data from a traffic device; determining a location of a second vehicle based on the traffic data; determining that the ownship vehicle has been instructed to synchronize with a second vehicle; generating a second graphical user interface indicating that the ownship vehicle has been instructed to synchronize with the second vehicle; and presenting the second graphical user interface on the display.

Example 2. A method includes determining an object in a travel path of an ownship vehicle; generating a first graphical user interface indicating the object; presenting the first graphical user interface on a display onboard the ownship vehicle; receiving traffic data from a traffic device; determining a location of a second vehicle based on the traffic data; determining that the ownship vehicle has been instructed to synchronize with a second vehicle; generating a second graphical user interface indicating that the ownship vehicle has been instructed to synchronize with the second vehicle; and presenting the second graphical user interface on the display.

Example 3. The method of example 1 or example 2, where the one or more of the steps are performed by processing circuitry onboard the ownship vehicle.

Example 4. The method of examples 1-3 or any combination thereof, wherein the processing circuitry is configured to generate the second graphical user interface including a graphical representation indicating that the ownship vehicle has been instructed to synchronize with the second vehicle.

Example 5. The method of examples 1-4 or any combination thereof, wherein the processing circuitry is configured to generate the second graphical user interface including a graphical representation indicating the terrain feature.

Example 6. The method of examples 1-5 or any combination thereof, wherein the processing circuitry is configured to generate the second graphical user interface including a graphical representation indicating the object.

Example 7. The method of examples 1-6 or any combination thereof, further including determining that the ownship vehicle has been instructed to synchronize with the second vehicle based on a clearance received by the ownship vehicle from a traffic control system.

Example 8. The method of examples 1-7 or any combination thereof, further including generating the second graphical user interface including a graphical representation indicating that the ownship vehicle has been instructed to follow the second vehicle.

Example 9. The method of examples 1-8 or any combination thereof, further including determining a direction of travel of the second vehicle based on the traffic data.

Example 10. The method of examples 1-9 or any combination thereof, further including generating the second graphical user interface including a graphical representation indicating the direction of travel of the second vehicle.

Example 11. The method of examples 1-10 or any combination thereof, further including determining a target speed for the ownship vehicle based on the traffic data.

Example 12. The method of examples 1-11 or any combination thereof, further including generating the second graphical user interface including a graphical representation indicating the target speed for the ownship vehicle.

Example 13. The method of examples 1-12 or any combination thereof, further including determining, based on the traffic data, a target speed for the ownship vehicle to maintain a desired spacing with the second vehicle.

Example 14. The method of examples 1-13 or any combination thereof, further including determining, based on the traffic data, whether a target speed is greater than, equal to, or less than an actual speed of the ownship vehicle.

Example 15. The method of examples 1-14 or any combination thereof, further including generating the second graphical user interface including a graphical representation indicating whether a target speed is greater than, equal to, or less than an actual speed of the ownship vehicle.

Example 16. The method of examples 1-15 or any combination thereof, further including causing an audio device to output a verbal command indicating a target speed.

Example 17. The method of examples 1-16 or any combination thereof, further including causing an audio device to output a verbal command indicating a change in a target speed.

Example 18. The method of examples 1-17 or any combination thereof, further including causing an audio device to output a verbal command indicating whether a target speed is greater than, equal to, or less than an actual speed of the ownship vehicle.

Example 19. The method of examples 1-18 or any combination thereof, further including determining a target spacing between the ownship vehicle and the second vehicle to synchronize with the second vehicle.

Example 20. The method of examples 1-19 or any combination thereof, further including generating the second graphical user interface including a graphical representation indicating the target spacing between the ownship vehicle and the second vehicle.

Example 21. The method of examples 1-20 or any combination thereof, further including presenting the second graphical user interface on a navigation display located in a cockpit of the ownship vehicle.

Example 22. The method of examples 1-21 or any combination thereof, further including presenting the second graphical user interface on the display via an ARINC-708 bus or via an ARINC-453 bus.

Example 23. The method of examples 1-22 or any combination thereof, further including presenting the second graphical user interface on a pre-existing display in the ownship vehicle without any hardware modifications or software modifications to the pre-existing display.

Example 24. The method of examples 1-23 or any combination thereof, further including presenting the second graphical user interface on a mobile device.

Example 25. The method of examples 1-24 or any combination thereof, further including determining that the ownship vehicle has been instructed to synchronize with the second vehicle based on a clearance received by a communication management unit from a traffic control system.

Example 26. The method of examples 1-25 or any combination thereof, further including determining that the ownship vehicle has been instructed to synchronize with the second vehicle based on user input.

Example 27. The method of examples 1-26 or any combination thereof, where the traffic device is external to a terrain awareness device performing the method.

Example 28. The method of examples 1-27 or any combination thereof, where the traffic device is external to a radar device performing the method.

Example 29. A terrain awareness device is configured to mount on an ownship vehicle, and the terrain awareness device includes processing circuitry configured to determine a terrain feature in a travel path of the ownship vehicle. The processing circuitry is also configured to present, on a display, a first graphical user interface indicating the terrain feature. The terrain awareness device also includes a memory configured to store a location of the terrain feature, and the terrain awareness device is configured to receive traffic data from a traffic device. The processing circuitry is further configured to determine a location of a second vehicle based on the traffic data and determine that the ownship first vehicle has been instructed to synchronize with a second vehicle. The processing circuitry is configured to generate a second graphical user interface indicating that the ownship vehicle has been instructed to synchronize with the second vehicle and present the second graphical user interface on the display.

Example 30. The terrain awareness device of example 29, where the processing circuitry is configured to perform the method of examples 1-28 or any combination thereof.

Example 31. The terrain awareness device of example 29 or example 30, where the terrain awareness device is coupled to a communication management unit configured to receive a clearance from a traffic control system.

Example 32. The terrain awareness device of examples 29-30 or any combination thereof, where the traffic device is external to the terrain awareness device.

Example 33. A radar device is configured to mount on an ownship vehicle, and the radar device includes processing circuitry configured to determine a terrain feature in a travel path of the ownship vehicle. The processing circuitry is also configured to present, on a display, a first graphical user interface indicating the terrain feature. The radar device also includes a memory configured to store a location of the terrain feature, and the radar device is configured to receive traffic data from a traffic device. The processing circuitry is further configured to determine a location of a second vehicle based on the traffic data and determine that the ownship first vehicle has been instructed to synchronize with a second vehicle. The processing circuitry is configured to generate a second graphical user interface indicating that the ownship vehicle has been instructed to synchronize with the second vehicle and present the second graphical user interface on the display.

Example 34. The radar device of example 33, where the processing circuitry is configured to perform the method of examples 1-28 or any combination thereof.

Example 35. The radar device of example 33 or example 34, where the radar device is coupled to a communication management unit configured to receive a clearance from a traffic control system.

Example 36. The radar device of examples 33-35 or any combination thereof, where the traffic device is external to the radar device.

Various examples of the disclosure have been described. Any combination of the described systems, operations, or functions is contemplated. These and other examples are within the scope of the following claims.

What is claimed is:

1. A terrain awareness device configured to mount on an ownship vehicle, the terrain awareness device comprising:
a memory configured to store a location of a terrain feature;
and processing circuitry configured to: receive radar data from a radar device;
determine the terrain feature in a travel path of the ownship vehicle based on the radar data;
output, to a navigation display in the ownship vehicle, a first graphical icon indicating a height of the terrain feature relative to an altitude of the ownship vehicle;
receive traffic data from a traffic device, wherein the traffic device is configured to receive the traffic data from one or more other aircraft via a first antenna;
determine a location of a second vehicle and a third vehicle based on the traffic data;
output, to the navigation display while the navigation display is outputting the first graphical icon, a second graphical icon representing the second vehicle and a third graphical icon representing the third vehicle;
receive traffic control data from a communication management unit, wherein the communication management unit receives the traffic control data from air traffic control via a second antenna;
select an entry corresponding to the second vehicle from a list of nearby vehicles to synchronize a landing of the ownship vehicle with a landing of the second vehicle, wherein the list includes the entry corresponding to the second vehicle and an entry corresponding to the third vehicle;
select a first runway of an aerodrome, wherein the second vehicle is assigned to a second runway, and the first runway and the second runway are different active runways of the aerodrome;
determine a target spacing between the ownship vehicle and the second vehicle to synchronize with the second vehicle based at least in part on a spacing between the first runway and the second runway;
determine a speed command based at least in part on a speed of the ownship vehicle and a speed of the second vehicle; output, to the navigation display while the navigation display is outputting the first graphical icon, the second graphical icon, and the third graphical icon, an indication of the speed command;
generate a fourth graphical icon indicating that the ownship vehicle has been instructed to synchronize with the second vehicle;
and output, to the navigation display while the navigation display is outputting the first graphical icon, the second graphical icon, the third graphical icon, and the indication of the speed command, the fourth graphical icon overlaid with existing symbology to identify that the landing of the second vehicle is synchronized with the landing of the ownship vehicle,
wherein the Processing circuitry is configured to output the fourth graphical icon on a pre-existing navigation display in the ownship vehicle without any hardware modifications or software modifications to the pre-existing navigation display.

2. The terrain awareness device of claim 1, wherein the fourth graphical icon comprises a triangle, and wherein the processing circuitry is configured to: determine a direction of travel of the second vehicle based on the traffic data;
and orient a direction of the triangle to indicate the direction of travel of the second vehicle.

3. The terrain awareness device of claim 1, wherein the processing circuitry is configured to: determine, based on the traffic data, a target speed for the ownship vehicle to maintain the target spacing with the second vehicle;
determine, based on the traffic data, whether the target speed is greater than, equal to, or less than an actual speed of the ownship vehicle;
and update the indication of the speed command based at least in part on the determination of whether the target speed is greater than, equal to, or less than the actual speed of the ownship vehicle.

4. The terrain awareness device of claim 3, wherein the processing circuitry is further configured to cause an audio device to output an audible alert based at least in part on the determination of whether the target speed is greater than, equal to, or less than the actual speed of the ownship vehicle.

5. The terrain awareness device of claim 1, wherein the processing circuitry is configured to output the fourth graphical icon on the navigation display via an ARINC-708 bus or via an ARINC-453 bus.

6. The terrain awareness device of claim 1, wherein to output the fourth graphical icon overlaid with existing symbology, the processing circuitry is configured to: overlay one or more of an arrow or chevron that highlights the second vehicle and indicates a direction of the second vehicle.

7. The terrain awareness device of claim 1, wherein the processing circuitry is further configured to: output, to the navigation display, a numerical value indicating an altitude difference between the second vehicle and the ownship vehicle.

8. The terrain awareness device of claim 1, wherein the processing circuitry is further configured to: output, to the navigation display, an arrow, wherein a direction of the arrow indicates whether the second vehicle is ascending or descending.

9. The terrain awareness device of claim 1, wherein the processing circuitry is configured to: output, to the navigation display, a fifth graphical icon representing the ownship vehicle, wherein a location of the fifth graphical icon relative to a location of the fourth graphical icon represents a location of the ownship vehicle relative to the location of the second vehicle.

10. The terrain awareness device of claim 1, wherein the processing circuitry is configured to: output, to the navigation display, an I-shaped icon and an arrow pointing to the I-shaped icon, wherein a location of the arrow relative to the I-shaped icon indicates whether the ownship vehicle needs to increase speed or decrease speed to maintain the target spacing between the ownship vehicle and the second vehicle.

11. A method comprising:
determining, by a terrain awareness device, a terrain feature in a travel path of an ownship vehicle;
outputting, to a navigation display in the ownship vehicle, a first graphical icon indicating a height of the terrain feature relative to an altitude of the ownship vehicle;
receiving traffic data from a traffic device, wherein the traffic device is configured to receive the traffic data from one or more other aircraft via a first antenna;
determining a location of a second vehicle and a third vehicle based on the traffic data;
outputting, to the navigation display while the navigation display is outputting the first graphical icon, a second graphical icon representing the second vehicle and a third graphical icon representing the third vehicle;
receiving traffic control data from a communication management unit, wherein the communication management unit receives the traffic control data from air traffic control via a second antenna;
selecting an entry corresponding to the second vehicle from a list of nearby vehicles to synchronize a landing of the ownship vehicle with a landing of the second vehicle, wherein the list includes the entry corresponding to the second vehicle and an entry corresponding to the third vehicle;
selecting a first runway of an aerodrome, wherein the second vehicle is assigned to a second runway, and the first runway and the second runway are different active runways of the aerodrome;
determining a target spacing between the ownship vehicle and the second vehicle to synchronize with the second vehicle based at least in part on a spacing between the first runway and the second runway;
determining a speed command based at least in part on a speed of the ownship vehicle and a speed of the second vehicle;
outputting, to the navigation display while the navigation display is outputting the first graphical icon, the second graphical icon, and the third graphical icon, an indication of the speed command;
generating a fourth graphical icon indicating that the ownship vehicle has been instructed to synchronize with the second vehicle;
and outputting, to the navigation display while the navigation display is outputting the first graphical icon, the second graphical icon, the third graphical icon, and the indication of the speed command, the fourth graphical icon overlaid with existing symbology to identify that the landing of the second vehicle is synchronized with the landing of the ownship vehicle,
wherein the Processing circuitry is configured to output the fourth graphical icon on a pre-existing navigation display in the ownship vehicle without any hardware modifications or software modifications to the pre-existing navigation display.

12. The method of claim 11, wherein the fourth graphical icon comprises a triangle, the method further comprising: determining a direction of travel of the second vehicle based on the traffic data;
and orienting a direction of the triangle to indicate the direction of travel of the second vehicle.

13. The method of claim 11, further comprising: determining, based on the traffic data, a target speed for the ownship vehicle to maintain the target spacing with the second vehicle;
and determining, based on the traffic data, whether the target speed is greater than, equal to, or less than an actual speed of the ownship vehicle;
updating the indication of the speed command based at least in part on the determination of whether the target speed is greater than, equal to, or less than the actual speed of the ownship vehicle.

14. The method of claim 13, further comprising: causing an audio device to output an audible alert based at least in part on the determination of whether the target speed is greater than, equal to, or less than the actual speed of the ownship vehicle.

15. The method of claim 11, further comprising: outputting the fourth graphical icon on the navigation display via an ARINC-708 bus or via an ARINC-453 bus.

16. The method of claim 11, wherein outputting the fourth graphical icon overlaid with existing symbology comprises: overlaying one or more of an arrow or chevron that highlights the second vehicle and indicates a direction of the second vehicle.

17. The method of claim 11, further comprising: outputting, to the navigation display, a numerical value indicating an altitude difference between the second vehicle and the ownship vehicle.

18. The method of claim 11, further comprising: outputting, to the navigation display, an arrow, wherein a direction of the arrow indicates whether the second vehicle is ascending or descending.

* * * * *